United States Patent [19]

Ohyama et al.

[11] Patent Number: 5,359,075

[45] Date of Patent: Oct. 25, 1994

[54] QUINOPHTHALONE COMPOUND

[75] Inventors: Tsukasa Ohyama; Yasushi Shimokawa; Yoriaki Matsuzaki; Keisuke Takuma, all of Fukuoka; Isamu Ghoda; Hitoshi Koshida, both of Hyogo, all of Japan

[73] Assignee: Mitsui Toatsu Chemicals, Incorporated, Tokyo, Japan

[21] Appl. No.: 924,875

[22] Filed: Aug. 5, 1992

[30] Foreign Application Priority Data

Aug. 6, 1991 [JP] Japan .................. 3-196624
Dec. 27, 1991 [JP] Japan .................. 3-345869

[51] Int. Cl.$^5$ .......................................... C09B 25/00
[52] U.S. Cl. ................................................ 546/154
[58] Field of Search ...................................... 546/154

[56] References Cited

U.S. PATENT DOCUMENTS

| | | | |
|---|---|---|---|
| 3,655,672 | 4/1972 | Spietschka et al. | 546/154 |
| 3,823,147 | 7/1974 | Spietschka et al. | 546/154 |
| 4,427,413 | 1/1984 | Bäuerle | 8/471 |
| 4,588,517 | 5/1986 | Kaneko et al. | 252/299.1 |

FOREIGN PATENT DOCUMENTS

| | | | |
|---|---|---|---|
| 0076633 | 4/1983 | European Pat. Off. | 546/154 |
| 0083553 | 7/1983 | European Pat. Off. | 546/154 |
| 0098522 | 1/1984 | European Pat. Off. | 252/299.1 |
| 0276171 | 7/1988 | European Pat. Off. | 546/154 |
| 1794040 | 10/1971 | Fed. Rep. of Germany | 546/154 |
| 2194832 | 3/1974 | France | 546/154 |
| 496063 | 9/1970 | Switzerland | 546/154 |
| 1426468 | 2/1976 | United Kingdom | 546/154 |

OTHER PUBLICATIONS

Patent Abstracts of Japan, vol. 7, No. 191 (C-182)(1336) Aug. 20, 1983.
Kato et al, Chemical Abstracts, vol. 106, No. 5, Abstract 34,652m, Feb. 2, 1987.
Kitao et al, Chemical Abstracts, vol. 86, No. 19, Abstract 141,628y, May 9, 1977.
Kitao et al, Chemical Abstracts, vol. 86, No. 11, Abstract 74,409n, Mar. 14, 1977.
Yoshiura et al, Chemical Abstract, vol. 83, No. 21, Abstract 180,311x, Nov. 24, 1975.
Mitsubishi Chemical Industries, Chemical Abstract, vol. 78, Abstract 17,628u, 1973.

Primary Examiner—C. Warren Ivy
Assistant Examiner—Zinna N. Davis
Attorney, Agent, or Firm—Millen, White, Zelano, & Branigan

[57] ABSTRACT

A novel quinophthalone compounds

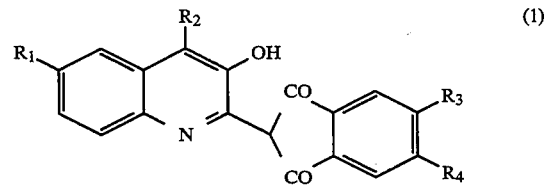

and the 2(2')-ene wherein when $R_1$ is tautomer a hydrogen atom, tautomer thereof an alkyl group having 2 to 8 carbon atoms which may be branched cycloalkyl group having 5 or 6 ring atoms, $R_2$ is a hydrogen atom, halogen atom, alkoxy group, alkylthio group, arylthio group which may be substituted, by alkyl of 1 to 4 carbon atoms, each of $R_3$ and $R_4$ is a hydrogen atom, alkyl group, N-substituted aminocarbonyl group, or a heterocyclic ring substituent having two or more ring atoms of one or more kinds selected from the group consisting of a nitrogen atom, oxygen atom and sulfur atom, $R_3$ and $R_4$ collectively with the ring carbon atoms to which they are attached form an N-substituted maleimide ring; provided however, that when $R_1$ is a hydrogen atom, is a hydrogen atom, and $R_3$ is a heterocyclic ring substituent having two or more ring atoms of one or more kinds selected from the group consisting of a nitrogen atom, oxygen atom and sulfur atom are, useful for coloring of polymeric materials, liquid crystal materials and the like.

19 Claims, No Drawings

QUINOPHTHALONE COMPOUND

BACKGROUND OF THE INVENTION (i) Field of the Invention

The present invention relates to a quinophthalone compound which is useful as a coloring agent for liquid crystal materials and organic polymeric materials.

(ii) Description of the Prior Art

Heretofore, it has been known that liquid crystal materials and organic polymeric materials are colored by using quinophthalone derivatives represented by the formula

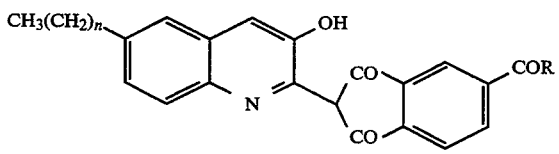

wherein R is an alkoxy group, alkylamino group or aralkyloxy group, and n is an integer of from 1 to 8, as dyestuffs (e.g., Japanese Patent Publication No. 20476/1973, and Japanese Patent Laid-open Nos. 93778/1983, 4674/1984, 4675/1984, 182877/1984 and 182878/1984).

However, when used to color the liquid crystal materials and organic polymeric materials, these compounds are unusable on occasion, because they are insufficiently compatible with a liquid crystal compound, a solvent, a binder matrix and the like. For example, when the compatibility of the quinophthalone compound with the liquid crystal compound is low, the contrast required for a guest-host type liquid crystal composition cannot be obtained. Furthermore, when the solubility of the quinophthalone compound in the solvent is low, a dyestuff-organic polymer coating film formed by a solvent coating method cannot possess a sufficient optical density. When the compatibility of the quinophthalone compound with the binder matrix is low, a polymeric film cannot be dyed at a high concentration, and the film in which the known quinophthalone compound is dispersed at a high concentration is opaque and cannot be used as a color filter or the like where transparency is required.

SUMMARY OF THE INVENTION

The present inventors have intensively sought to develop a quinophthalone derivative compound which has a high solubility in a liquid crystal material and various resins and which can be colored and dyed at a high concentration, and as a result, they have found that a specific derivative is suitable to achieve the above-mentioned object. The present invention has been attained on the basis of this knowledge.

The present invention is directed to a quinophthalone compound represented by the formula (1)

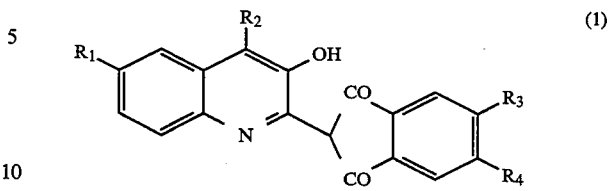

wherein when $R_1$ is a hydrogen atom, an alkyl group having 2 to 8 carbon atoms which may be branched, or a cycloalkyl group of 5 to 6, $R_2$ is a hydrogen atom, halogen atom, an alkoxy group alkylthio group, arylthio group which may be substituted by alkyl having 1 to 4 carbon atoms; each of $R_3$ and $R_4$ is a hydrogen atom, alkyl group, N-substituted aminocarbonyl group, or a substituted heterocyclic ring having two or more ring atoms of one or more kinds selected from the group consisting of a nitrogen atom, oxygen atom and sulfur atom, and $R_3$ and $R_4$ may be bonded to each other to form a ring; however, when $R_1$ is a hydrogen atom, each of $R_3$ provided a hydrogen atom, $R_4$ is a substituted or unsubstituted heterocyclic ring having two or more ring atoms of one or more kinds selected from the group consisting of a nitrogen atom, oxygen atom and sulfur atom.

The compound of formula (1) can tautomer exist as the 2(2')-ene-3-oxo represented by the following formula (1'), which tautomer is also within the present invention:

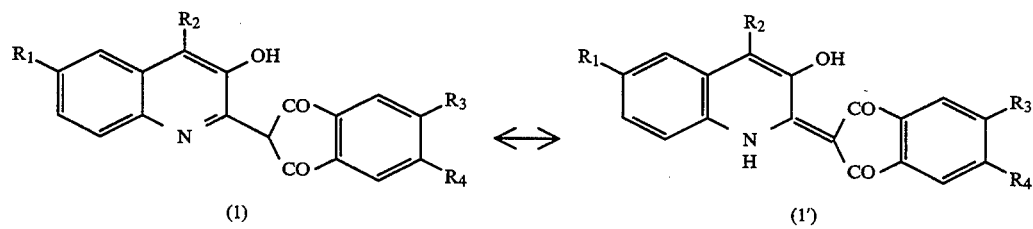

Therefore, an object of the present invention is to provide a novel quinophthalone compound which has a high solubility in a solvent, a high compatibility with a binder and a stability to heat and light and which is suitable to color liquid crystal materials and organic polymeric materials.

DETAILED DESCRIPTION OF THE INVENTION

In a quinophthalone compound represented by the formula (1) or (1') of the present invention, $R_1$ is a hydrogen atom, alkyl group or cycloalkyl group having 8 or less carbon atoms which may branch, examples of this alkyl group include methyl, ethyl, n-propyl, iso-propyl, n-butyl, iso-butyl, sec-butyl, tert-butyl, n-pentyl, n-hexyl, n-heptyl and n-octyl groups.

The above-mentioned cycloalkyl group preferably has 5 to 6 carbon atoms, and its examples include cyclopentyl and cyclohexyl groups.

$R_2$ is a hydrogen atom, halogen atom, alkoxy group which may be substituted, alkylthio group, arylthio group which may be substituted.

Preferable examples of the halogen atom include fluorine, chlorine and bromine.

The preferable alkoxy which may be substituted has 8 or less carbon atoms, and its typical examples include methoxy, ethoxy, n-propoxy, iso-propoxy, n-butoxy, iso-butoxy and tert-butoxy groups.

The preferable alkylthio group has 8 or less carbon atoms, and its typical examples include methylthio, ethylthio, n-propylthio, iso-propylthio, n-butylthio and iso-butylthio groups.

Preferable examples of the arylthio group which may be substituted include phenylthio groups substituted by alkyl groups having 10 or less carbon atoms such as phenylthio, o-methylphenylthio, m-methylphenylthio and p-methylphenylthio groups.

Each of $R_3$ and $R_4$ is a hydrogen atom, alkyl group, N-substituted aminocarbonyl group, or substituted or unsubstituted heterocyclic ring having two or more atoms of one or more kinds selected from the group consisting of a nitrogen atom, oxygen atom and sulfur atom, and $R_3$ and $R_4$ may be bonded to each other to form a ring.

The preferable alkyl group has 1 to 6 carbon atoms, and its typical examples include methyl, ethyl, n-propyl, iso-propyl, butyl, pentyl and hexyl groups.

The preferable N-substituted aminocarbonyl group has 2 to 18 carbon atoms, and its typical examples include methylaminocarbonyl, ethylaminocarbonyl, n-propylaminocarbonyl, n-butylaminocarbonyl, n-pentylaminocarbonyl, n-hexylaminocarbonyl, n-heptylaminocarbonyl, n-octylaminocarbonyl, dimethyaminocarbonyl, diethylaminocarbonyl, di-n-propylaminocarbonyl, di-iso-propylaminocarbonyl, di-n-butylaminocarbonyl, di-n-pentylaminocarbonyl, di-n-hexylaminocarbonyl, di-n-heptylaminocarbonyl and di-n-octylaminocarbonyl groups.

The preferable substituted or unsubstituted heterocyclic ring group having two or more ring atoms of one or more kinds selected from the group consisting of a nitrogen atom, oxygen atom and sulfur atom has a five-membered ring or six-membered ring. Typical examples of the substituent on the ring include alkyl groups such as methyl, ethyl, n-propyl, iso-propyl, n-butyl, iso-butyl and tert-butyl groups; alkoxy groups such as methoxy, ethoxy, n-propoxy and n-butoxy; alkylcarboxyalkyl groups such as methylcarboxymethyl, ethycarboxymethyl, n-propylcarboxymethyl, iso-propylcarboxymethyl and n-butylcarboxymethyl groups; and alkoxycarboxyalkyl groups such as methoxycarboxymethyl, ethoxycarboxymethyl, n-propoxycarboxymethyl, iso-propoxycarboxymethyl and n-butoxycarboxymethyl groups. Typical examples of the heterocyclic ring group include oxazoline, oxazole, benzooxazole, thiazoline, thiazole, benzothiazole, imidazoline, imidazole, benzoimidazole, oxadiazole and thiadiazole.

When the adjacent groups of $R_3$ and $R_4$ form a ring, the compound of formula (1) can have the following chemical structure

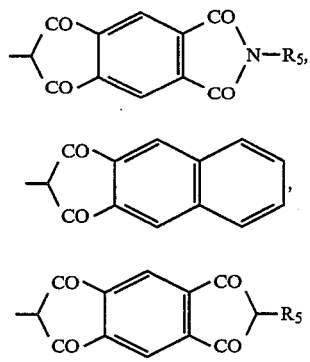

[wherein $R_5$ is an alkyl group having 1 to 8 carbon atoms such as a methyl, ethyl, n-propyl, iso-propyl, n-butyl, n-pentyl, n-hexyl, n-heptyl or n-octyl group, or a substituted or unsubstituted phenyl group such as a p-methoxyphenyl, p-butoxyphenyl, p-octyloxyphenyl, p-t-butylphenyl, 4'-butoxybiphene-4-yl, 4'-octyloxybiphene-4-yl or 4'-(5-methylbenzoxazo-2-yl)biphene-4-yl] group.

However, when $R_1$ is a hydrogen atom, each of $R_3$ and $R_4$ is a hydrogen atom, or a substituted or unsubstituted heterocyclic ring having two or more ring atoms of one or more kinds selected from the group consisting of a nitrogen atom, oxygen atom and sulfur atom.

The substituted or unsubstituted heterocyclic ring group having two or more ring atoms of one or more kinds selected from the group consisting of a nitrogen atom, oxygen atom and sulfur atom is preferably a five-membered ring or six-membered ring. Examples of the substituent by which the ring can be substituted include alkyl groups such as methyl, ethyl, n-propyl, iso-propyl, n-butyl, iso-butyl and tert-butyl groups; alkoxy groups such as methoxy, ethoxy, n-propoxy and n-butoxy groups; alkylcarboxyalkyl groups such as methylcarboxymethyl, ethylcarboxymethyl, n-propylcarboxymethyl, iso-propylcarboxymethyl and n-butylcarboxymethyl groups; and alkoxycarboxyalkyl groups such as methoxycarboxymethyl, ethoxycarboxymethyl, n-propoxycarboxymethyl, iso-propoxycarboxymethyl and n-butoxycarboxymethyl groups. Typical examples of the heterocyclic ring group include oxazoline, oxazole, benzooxazole, thiazoline, thiazole, benzothiazole, imidazoline, imidazole, benzoimidazole, oxadiazole and thiadiazole.

The quinophthalone compound represented by formula (1) or (1') of the present invention can be prepared by reacting (a) 3-hydroxy-2-methyl-4-cinchonic acid with (b) a phthalic anhydride to obtain quinophthalone (c), and substituting the 4-position of the thus obtained quinophthalone (c) by a usual electrophilic reagent, or alternatively first substituting the 4-position by a halogen and then replacing the halogen with a usual nucleophilic reagent, whereby the substituent is introduced into the 4-position:

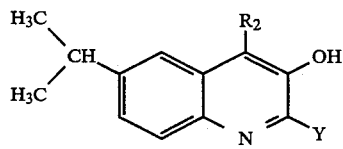

wherein Y is any one of the following groups,

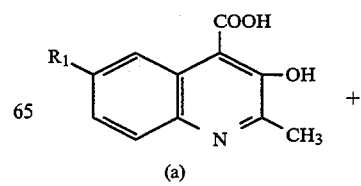

(a)

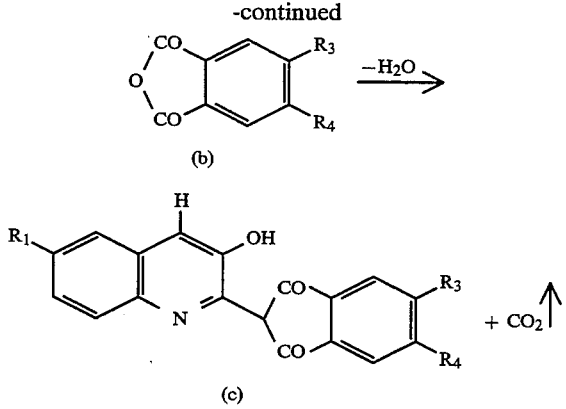

(b)

(c)

The reaction of compound (a) with compound (b) is carried out in a high-boiling solvent such as nitrobenzene, o-dichlorobenzene, sulfolane, DMF or DMI at a temperature of from 150° to 230° C., preferably 180° to 210° C. In order to introduce a substituent such as an alkoxycarbonyl or alkylaminocarbonyl heterocyclic ring as $R_3$ or $R_4$, the compound (b) in which a carboxylic acid has been previously introduced into the substituent-introducing position is subjected to the abovementioned reaction to obtain a compound (c) in which the carboxylic acid group is introduced. Afterward, compound (c) is subjected to an amidation or cyclization to obtain the desired compound.

The introduction of the substituent into the 4-position of the thus obtained quinophthalone (c) can be achieved by substituting the 4-position by a usual electrophilic reagent, or alternatively first substituting the 4-position by a halogen and then replacing the halogen with a usual nucleophilic reagent.

A liquid crystal composition in which the quinophthalone compound of the present invention is used as a dyestuff can be prepared by first dissolving the dyestuff in a suitable liquid crystal compound, pouring the solution into a liquid crystal cell having a thickness of 10 μm which has been treated for homogeneous orientation, and then hermetically sealing the cell. In this case, the amount of the dyestuff is usually in the range of from 0.5 to 5.0% by weight, preferably from 1.0 to 3.0% by weight based on the weight of the liquid crystal. Examples of the liquid crystal which can be usually used include E-8, E-7, E-44, ZLI-1132, ZLI-1840 and ZLI-2806 (Merck AG). Additionally, for the PDLC type liquid crystal in which a solution of the dyestuff and the liquid crystal compound is dispersed in a polymeric matrix, the dyestuff of the present invention is useful.

The coloring of a resin with the present dyestuff can be achieved by dissolving the dyestuff in a suitable synthetic resin at a temperature suitable for the resin, and then molding the resin in compliance with an application. Alternatively, the already molded resin can be colored by the use of a suitable dyestuff bath containing the present dyestuff. Examples of the usually usable resin include PS, ABS, PMMA, PC, PVC, PET and 6-nylon. The amount of the dyestuff is in the range of from 0.01 to 10% by weight, preferably from 0.01 to 5% by weight based on the weight of the resin.

The compound of the present invention is very suitable for the coloring of liquid crystal materials and organic polymeric materials at a high concentration.

In addition, the compound of the present invention is stable to heat, light, humidity and chemicals, and in the materials colored with this compound, a sharp and transparent color tone can be maintained. The compound of the present invention has excellent shelf stability.

Now, the present invention will be described in more detail in reference to examples. In these examples, "part(s)" and "%" are on weight.

EXAMPLE 1

A compound represented by the formula (B) was prepared as follows.

53.8 parts of trimellitic anhydride and 50.8 parts of 3-hydroxy-2-methylquinoline-4-carboxylic acid were added to 538 parts of sulfolane, and reaction was then carried out at 200° C. for 1 hour to obtain 68 parts of a compound having the formula (A) which was the precursor of the desired compound.

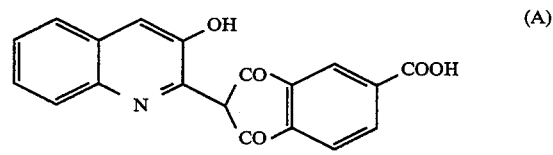

(A)

10 parts of the compound having the formula (A) and 0.4 part of pyridine were added to 60 parts of o-dichlorobenzene, and the solution was heated up to 100° C. Successively, 7.2 parts of thionyl chloride were added thereto, and reaction was then carried out at 100° C. for 2 hours. Afterward, excessive thionyl chloride was removed at 100° C. under reduced pressure, and 3.4 parts of 3-amino-2-propanol were added, followed by reaction at 100° C. for 1 hour. Furthermore, the solution was heated up to 170° C. and reaction was carried out for 7 hours to obtain 9.5 parts of the compound represented by the formula (B).

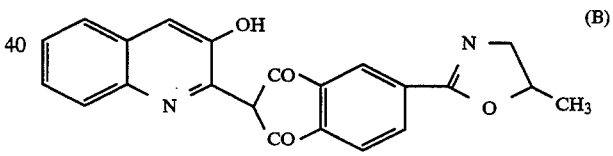

(B)

Compound (B) had a melting point from 244° to 246° C., and its maximum absorption wavelength in toluene was 448 nm.

| Results of elemental analysis ($C_{22}H_{16}N_2O_4$): | | |
| --- | --- | --- |
| C | H | N |
| Calcd. (%) 70.96 | 4.33 | 7.52 |
| Found (%) 70.90 | 4.30 | 7.58 |

EXAMPLE 2

A compound represented by the formula (C) was prepared as follows.

10 parts of a compound having the formula (A) and 0.4 part of pyridine were added to 50 parts of nitrobenzene, and the solution was then heated up to 100° C. Next, 7.2 parts of thionyl chloride were added thereto, and reaction was then carried out at 100° C. for 2 hours. Afterward, excessive thionyl chloride was removed at 100° C. under reduced pressure, and 4.6 parts of isopropylcarbonylhydrazine were then added, followed by reaction for 1 hour. Furthermore, 14.3 parts of thionyl chloride were added thereto, the solution was heated up to 130° C. and reaction was then carried out for 4 hours to obtain 7.9 parts of the compound represented by the formula (C).

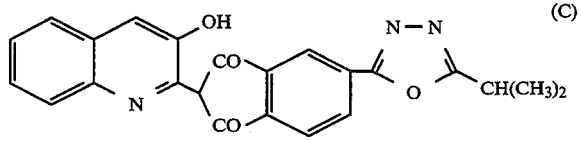

Compound (C), had a melting point from 210° to 211° C. and its maximum absorption wavelength in toluene was 450 nm.

| Results of elemental analysis (C₂₃H₁₇N₃O₄): | | | |
|---|---|---|---|
| | C | H | N |
| Calcd. (%) | 69.17 | 4.29 | 10.52 |
| Found (%) | 69.15 | 4.30 | 10.50 |

EXAMPLE 3

Preparation of a compound having a formula (D):

9.8 parts of phthalic anhydride and 10.5 parts of 3-hydroxy-2-methyl-6-isopropyl-4-cinchonic acid were added to 150 parts of sulfolane, and reaction was then carried out at 195° C. for 1 hour. Insolubles were then removed from the solution at 100° C. by hot filtration, and the resultant filtrate was then poured into water at room temperature. The deposited crystals were collected by filtration to obtain 18.2 parts of the compound represented by the formula (D).

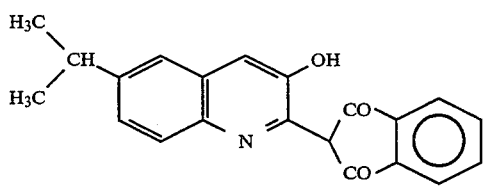

Compound (D) had a melting point from 215° to 218° C. and its maximum absorption wavelength in toluene was 450 nm.

| Results of elemental analysis (C₂₁H₁₇NO₃): | | | |
|---|---|---|---|
| | C | H | N |
| Calcd. (%) | 76.13 | 5.14 | 4.23 |
| Found (%) | 76.33 | 5.02 | 4.11 |

EXAMPLE 4

Preparation of a compound having a formula (F):

21.1 parts of trimellitic anhydride were added to 285 parts of sulfolane, and the solution was then heated up to 185° C. 24.6 parts of 3-hydroxy-2-methyl-6-isopropylquinolin-4-carboxylic acid were further added thereto, and reaction was then carried out at 200° C. for 1 hour to obtain 37.2 parts of a compound having the formula (E) which was the precursor of the desired compound.

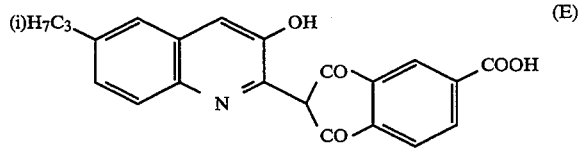

5 parts of the compound (E) were added to 25 parts of o-dichlorobenzene and the solution was then heated up to 100° C. Next, 3.6 parts of thionyl chloride were added dropwise thereto, and the solution was then maintained at this temperature for 2.5 hours. Then, excess thionyl chloride was removed under reduced pressure. At the same temperature, 6 parts of dibutylamine were added dropwise, and this temperature was maintained for 2 hours. The resultant reaction solution was cooled to room temperature, and then poured into 50 parts of methanol to obtain 6 parts of the compound having the formula (F):

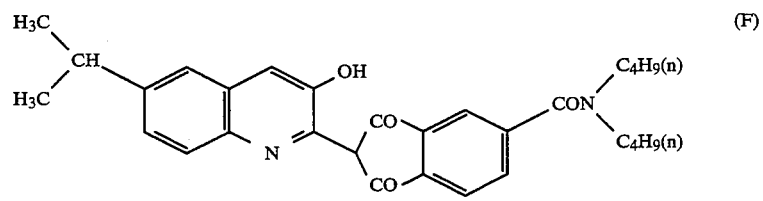

Compound (F) had a melting point from 143° to 144° C. and its maximum absorption wavelength in toluene was 450 nm.

| Results of elemental analysis (C₃₀H₃₄N₂O₄): | | | |
|---|---|---|---|
| | C | H | N |
| Calcd. (%) | 74.07 | 7.00 | 5.76 |
| Found (%) | 74.11 | 6.98 | 5.64 |

EXAMPLE 5

Preparation of the compound having a formula (G):

6 parts of the compound having the formula (E) and 0.2 part of pyridine were added to 42 parts of o-dichlorobenzene, and the solution was heated up to 100° C. Successively, 3.8 parts of thionyl chloride were added thereto, and reaction was then carried out at 100° C. for 2 hours. Afterward, excessive thionyl chloride was removed at 100° C. under reduced pressure. The solution was cooled to 80° C. and 6.9 parts of 2-amino-2-ethyl-1,3-propanediol were added thereto, and reaction was then carried out at 80° C. for 2 hours. Afterward, the solution was heated up to 170° C., and reaction was then carried out for 5 hours to obtain 4.2 parts of the compound represented by the formula (G).

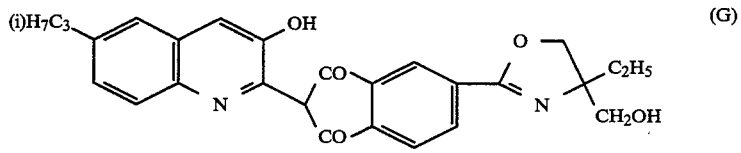

Compound (G) had a melting point from 239° to 241° C., and its maximum absorption wavelength in toluene was 450 nm.

| Results of elemental analysis ($C_{27}H_{26}N_2O_5$): | | | |
|---|---|---|---|
| | C | H | N |
| Calcd. (%) | 70.73 | 5.72 | 6.11 |
| Found (%) | 70.70 | 5.75 | 6.14 |

EXAMPLE 6

Preparation of the compound having the formula (H):

4 parts of the compound having the formula (G) were added to 40 parts of N-methylpyrrolidone, and 14 parts of isobutyryl chloride were added thereto. Then, reaction was carried out at room temperature for 5 hours to obtain 4.4 parts of the compound represented by the formula (H):

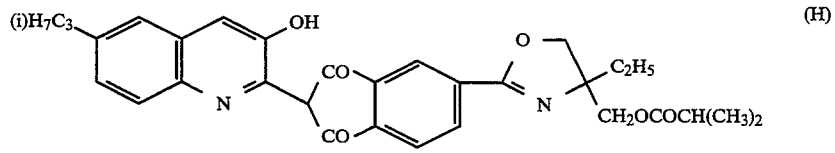

With regard to the compound (H), a melting point was from 163° to 165° C., and a maximum absorption wavelength in toluene was 450 nm.

| Results of elemental analysis ($C_{31}H_{32}N_2O_6$): | | | |
|---|---|---|---|
| | C | H | N |
| Calcd. (%) | 70.44 | 6.10 | 5.30 |
| Found (%) | 70.40 | 6.13 | 5.35 |

EXAMPLE 7 to 13

Compounds shown in Table 1 were synthesized by the same procedure as in Example 4.

TABLE 1

| Example | Structural Formula | λmax (nm) | m.p. (°C.) |
|---|---|---|---|
| 7 | [quinoline with 6-isopropyl, 3-OH, 2-(benzodioxole-CONHC4H9(n))] | 450 | 160–161 |
| 8 | [quinoline with 6-isopropyl, 3-OH, 2-(benzodioxole-bis-CONHC3H7(i))] | 460 | 138–140 |
| 9 | [quinoline with 6-isopropyl, 4-Br, 3-OH, 2-(benzodioxole-CONHC6H13(n))] | 450 | 152–153 |
| 10 | [quinoline with 6-isopropyl, 4-S-C4H9(n), 3-OH, 2-(benzodioxole)] | 450 | 166–167 |

TABLE 1-continued

| Example | Structural Formula | λmax (nm) | m.p. (°C.) |
|---|---|---|---|
| 11 | (isopropyl-quinoline with OH, benzodioxole, CON(C₃H₇(n))₂) | 450 | 148–149 |
| 12 | (isopropyl-quinoline with OH, bis-benzodioxole-imide, biphenyl-OC₈H₁₇(n)) | 455 | 250< |
| 13 | (isopropyl-quinoline with OH, bis-benzodioxole-imide, biphenyl-benzoxazole-CH₃) | 455 | 250< |

Liquid Crystal Preparation Examples 1 to 2, Comparative Preparation Examples 1 and 2

Each of the dyestuffs of Examples 12 and 13 was added to 9.8 parts of a liquid crystal mixture of a trade name E-8 made by Merck AG, and the mixture was then heated up to about 60° C. to completely dissolve the dyestuff. After cooling, the solution was poured into a liquid crystal display element, and it was then hermetically sealed. This display device showed a sharp and deep yellow during applying no voltage, and when the voltage was applied, electrode parts were colorless, so that a good contrast was obtained.

Each sample was put on a light path of a spectrophotometer, and an absorbance A was measured by applying straight polarized light to the liquid crystal in parallel with the arrangement of the liquid crystal and an absorbance A' was measured by applying straight polarized light to the liquid crystal at a right angle to the arrangement of the liquid crystal. By the use of the thus measured absorbances A and A', a dichroic ratio was calculated in accordance with the following formula:

Dichroic ratio = A/A'

Furthermore, as comparative preparation examples, otherwise the same liquid crystals as mentioned above were prepared from compounds for comparison represented by the following formulae (K) and (L). The results are set forth in Table 2.

TABLE 2

| | Compound | Dichroic Ratio |
|---|---|---|
| Preparation Example 1 | Comp. of Example 12 | 8.5 |
| Preparation Example 2 | Comp. of Example 13 | 9.1 |
| Comp. Prep. Example 1 | Comp. of Formula (I) | —* |
| Comp. Prep. Example 2 | Comp. of Formula (J) | —* |

*Each of the compounds (I) and (J) was not completely dissolved in the liquid crystal, and thus the dichroic ratio could not be calculated.

TABLE 2-continued

| Compound | Dichroic Ratio |
|---|---|
| (n)H₉C₄-quinoline-OH-benzodioxole-COOC₈H₁₇(n) | (I) |
| H₃C-quinoline-OH-benzodioxole-COOC₄H₉(n) | (J) |

Solubility Measurement Examples 1 to 6, Comparative Measurement Examples 1 and 2

For the six compounds (B) to (H) of Examples 1 to 6 and the compounds (I) and (J) for comparison, the solubility of each compound in a solvent was measured. The results are set forth in Table 3.

TABLE 3

| | Compound | (%, at 20° C.) | | | |
|---|---|---|---|---|---|
| | | Acetone | Toluene | DMF | THF |
| Solubility Measurement Example | | | | | |
| 1 | B | 3.48 | 3.98 | 6.91 | 6.50 |
| 2 | C | 3.95 | 4.22 | 7.03 | 6.55 |
| 3 | D | 1.58 | 1.79 | 3.56 | 2.28 |
| 4 | F | 7.10 | 10.52 | 13.49 | 12.63 |
| 5 | G | 3.84 | 4.01 | 6.91 | 6.50 |
| 6 | H | 5.31 | 8.85 | 12.64 | 10.38 |
| Comparative Measurement Example | | | | | |
| 1 | I | 0.33 | 0.51 | 1.20 | 0.98 |
| 2 | J | 0.13 | 0.28 | 0.78 | 0.34 |

As is apparent from the data in Table 3, the products of the present invention had high solubilities in the various solvents.

Resin Coloring Suitability Test

For the compounds (B, C, D, F, G and H), a resin coloring suitability test was conducted. The results are set forth in Table 4.

EXAMPLES 14 to 21

Compounds of the present invention were synthesized by about the same procedures as described above, and the physical properties of these compounds are set forth in Table 5.

TABLE 4

| Compound | Resin Coloring Suitability (containing 0.02 pts. wt.) | | | | | | | | | | | |
|---|---|---|---|---|---|---|---|---|---|---|---|---|
| | PS | | | ABS | | | PET | | | PC | | |
| | L | H | B | L | H | B | L | H | B | L | H | B |
| B | ⊚ | ⊚ | ○ | ⊚ | ○ | ○ | ⊚ | ○ | ○ | ⊚ | ⊚ | ○ |
| C | ⊚ | ⊚ | ○ | ⊚ | ○ | ○ | ⊚ | ○ | ○ | ⊚ | ⊚ | ○ |
| D | ⊚ | ⊚ | ○ | ⊚ | ○ | ○ | ⊚ | ○ | ⊚ | ⊚ | ⊚ | ○ |
| F | ⊚ | ⊚ | ⊚ | ⊚ | ○ | ⊚ | ⊚ | ⊚ | ⊚ | ⊚ | ⊚ | ⊚ |
| G | ⊚ | ⊚ | ⊚ | ⊚ | ○ | ⊚ | ⊚ | ⊚ | ⊚ | ⊚ | ⊚ | ⊚ |
| H | ⊚ | ⊚ | ⊚ | ⊚ | ○ | ⊚ | ⊚ | ⊚ | ⊚ | ⊚ | ⊚ | ⊚ |

PS: Polystyrene
ABS: Acrylonitrile/butadiene/styrene
PET: Polyethylene glycol terephthalate
PC: Polycarbonate
L: Light resistance, 63° C./80 hr. carbon arc lamp, Blue scale judgement
H: Heat resistance, 300° C./10 min., Gray scale judgement
B: Bleeding properties: A colored plate was superposed upon a vinyl chloride plate, and a pressure of 5 kg/cm$^2$ was applied thereto and a treatment was then carried out at 90° C. for 5 hr. Afterward, the soil on the vinyl chloride plate was evaluated by a gray scale.
Light resistance: Evaluation was made by a blue scale judgement, and the seventh grade or more was denoted by ⊚ and the fifth to seventh grades by ○.
Heat resistance and bleed resistance: Evaluation was made by a blue scale judgement, and the fifth grade or more was denoted by ⊚ and the third to fifth grades by ○.

TABLE 5

| Example | Structural Formula | γmax (nm) | m.p. (°C.) |
|---|---|---|---|
| 14 | [Structure: 4-(4-tert-butylphenylthio)-quinoline with OH, linked via methylenedioxy-phenyl to imidazoline with C$_8$H$_{17}$] | 450 | 165–167 |
| 15 | [Structure: 6-isopropyl-3-hydroxyquinoline with methylenedioxy-phenyl linked to thiadiazole with CH(CH$_3$)$_2$] | 450 | 220–221 |
| 16 | [Structure: 3-hydroxyquinoline with methylenedioxy-phenyl linked to oxazoline bearing two CH$_2$OCOCH$_3$ groups] | 450 | 130–131 |
| 17 | [Structure: 3-hydroxyquinoline with methylenedioxy-phenyl linked to oxazoline bearing C$_2$H$_5$ and C$_6$H$_{13}$] | 450 | 150–151 |
| 18 | [Structure: 6-isopropyl-3-hydroxyquinoline with methylenedioxy-phenyl linked to benzoxazole with CH$_3$] | 450 | 230–231 |

TABLE 5-continued

| Example | Structural Formula | γmax (nm) | m.p. (°C.) |
|---|---|---|---|
| 19 | 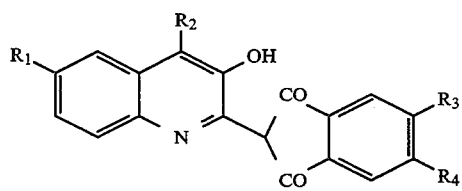 | 450 | 121–122 |
| 20 | 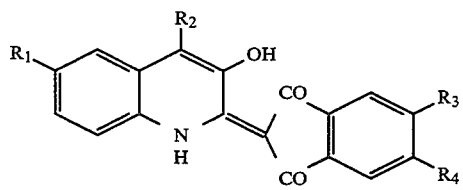 | 450 | 129–130 |
| 21 | | 450 | 122–123 |

What is claimed is:

1. A quinophthalone compound represented by formula (1)

(1)

or the 2(2')-ene tautomer thereof represented by Formula (1')

(1')

wherein R₁ is a hydrogen atom, an alkyl group having 2 to 8 carbon atoms which may be branched, or cycloalkyl group having 5 to 6 carbon atoms, R₂ is a hydrogen atom, halogen atom, alkylthio group having 1 to 8 carbon atoms, arylthio group which may be substituted by an alkyl group of 1 to 4 carbon atoms, each of R₃ and R₄ is a hydrogen atom, a dialkyl amino carbonyl or alkylaminocarbonyl group, or a heterocyclic ring group selected from the group consisting of an oxazoline, an oxazole, a benzooxazole, a thiazoline, a thiazole, a benzothiazole, an imidazoline, an imidazole, a benzoimidazole, and oxadiazole, a thiadiazole, or a benzooxazoline, each optionally substituted by alkyl, alkoxy, hydroxymethylene, alkylcarboxyalkyl or alkoxycarboxyalky group(s) or R₃ and R₄ may be bonded to each other to form an N-substituted maleimide ring of one of the following formulae:

provided, however, when R₁ is a hydrogen atom, and R₄ is a hydrogen atom, R₃ is a heterocyclic ring as defined above.

2. A compound of claim 1, wherein R₁ and R₂ each is a hydrogen atom.

3. A compound of claim 2, wherein R₃ is selected from the group consisting of oxazoline, oxazole, benzooxazole, thiazoline, thiazole, benzothiazole, imidazoline, imidazole, benzoimidazole, oxadiazole and thiadiazole.

4. A compound of claim 1, wherein R₁ is alkyl and R₂ and R₄ each is a hydrogen atom.

5. A compound of claim 4, wherein R₃ is an N-alkylaminocarbonyl group.

6. A compound of claim 1 of the formula

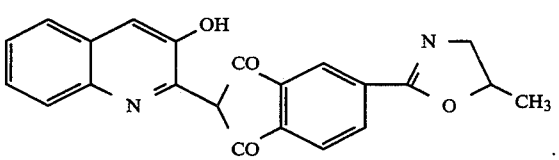

7. A compound of claim 1 of the formula

8. A compound of claim 1 of the formula
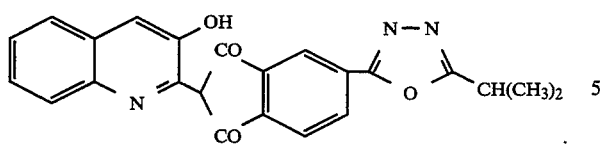
9. A compound of claim 1 of the formula
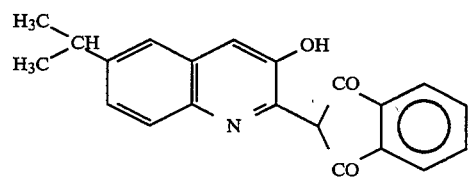
10. A compound of claim 1 of the formula
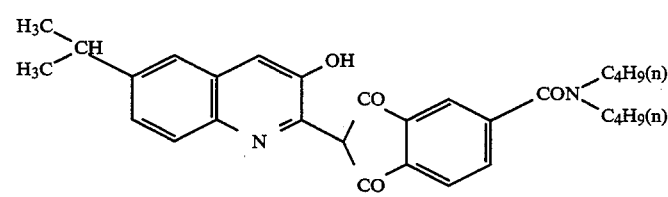
11. A compound of claim 1 of the formula
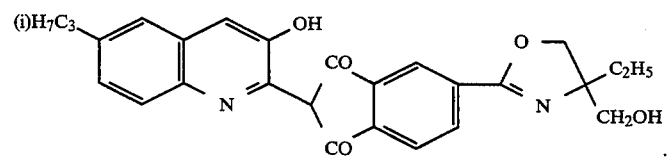
12. A compound of claim 1 of the formula
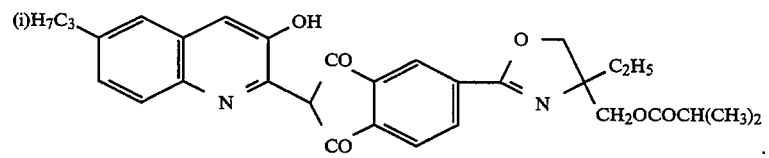
13. A compound of claim 1 of the formula
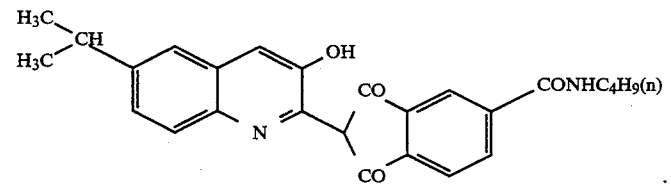
14. A compound of claim 1 of the formula
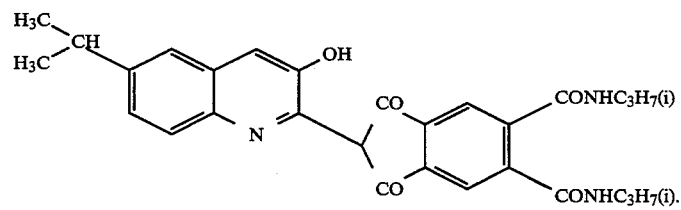

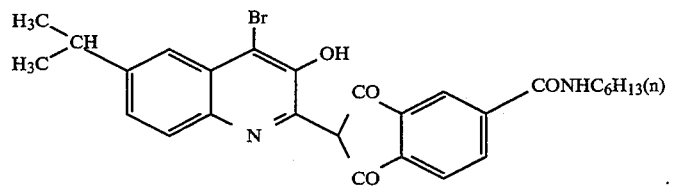
15. A compound of claim 1 of the formula
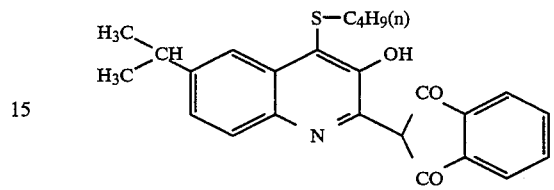
16. A compound of claim 1 of the formula
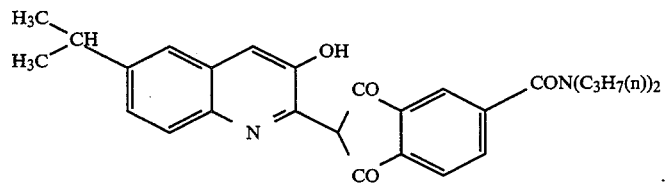
17. A compound of claim 1 of the formula
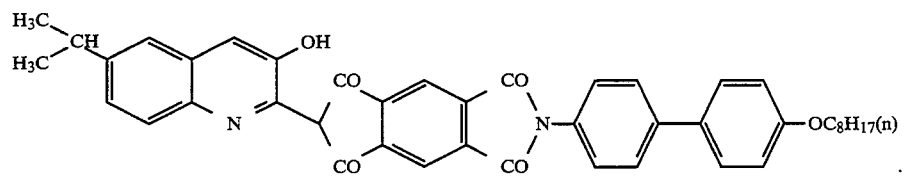
18. A compound of claim 1 of the formula
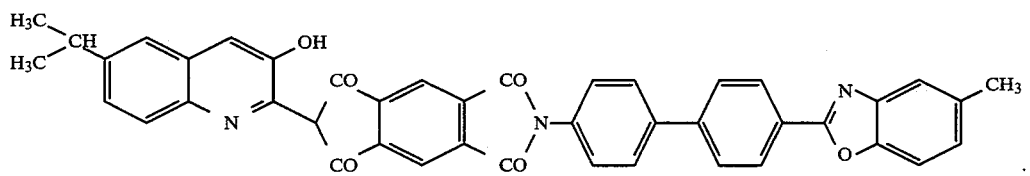
19. The compound of claim 4 wherein $R_3$ is an alkyl aminocarbonyl group having 2 to 8 carbon atoms or a heterocyclic ring group.
* * * * *